United States Patent Office 3,769,275
Patented Oct. 30, 1973

3,769,275
1-(DI-LOWER ALKYLAMINOALKYL)-1,3-DIHYDRO-5-PHENYL-2H-1-BENZAZEPIN - 2 - ONES AND INTERMEDIATES THEREFOR
Bernard Loev, Broomall, and Charles L. Zirkle, Berwyn, Pa., assignors to Smith Kline & French Laboratories, Philadelphia, Pa.
No Drawing. Filed Sept. 9, 1970, Ser. No. 70,879
Int. Cl. C07d 41/06, 41/08
U.S. Cl. 260—239.3 B                    7 Claims

ABSTRACT OF THE DISCLOSURE

The compounds are 1 - (di-lower alkylaminoalkyl)-1,3-dihydro - 5 - phenyl - 2H - 1 - benzazepin-2-ones which inhibit gastric acid secretion and intermediates for the preparation thereof.

This invention relates to new 1-(di-lower alkylaminoalkyl) - 1,3 - dihydro - 5 - phenyl-2H-1-benzazepin-2-ones having pharmacodynamic activity. In particular, these compounds inhibit gastric acid secretion. This invention also relates to 1,3 - dihydro - 5 - phenyl-2H-1-benzazepin-2-ones which are intermediates for the preparation of the pharmacologically active, corresponding 1-(di-lower alkylaminoalkyl) compounds.

The 1-(di-lower alkylaminoalkyl)-1,3-dihydro-5-phenyl-2H-1-benzazepin-2-ones of this invention are represented by the following formula:

FORMULA I

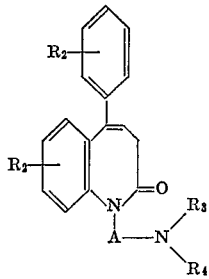

in which:

A is alkylene having 2 to 4 carbon atoms, preferably ethylene or propylene;
$R_1$ is hydrogen, halo, lower alkyl or lower alkoxy;
$R_2$ is hydrogen, halo, trifluoromethyl, lower alkyl or lower alkoxy; and
$R_3$ and $R_4$ are lower alkyl and pharmaceutically acceptable, acid addition salts thereof.

Preferred compounds of this invention are represented by Formula I above in which A is ethylene or propylene, $R_1$ and $R_2$ are hydrogen and $R_3$ and $R_4$ are methyl.

The compounds of Formula I produce inhibition of gastric acid secretion by increasing the gastric pH or decreasing the volume of gastric juice or both. This activity is demonstrated by administration to chronic gastric fistula rats (Brodie et al., Amer. J. Physiol., 202:812–814, 1962) at doses of about 50 mg./kg. orally.

The compounds of this invention are prepared as follows:

FORMULA II

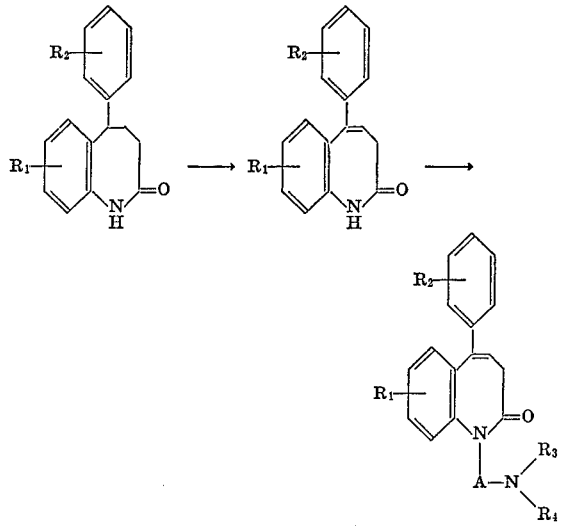

The terms $R_1$, $R_2$, $R_3$, $R_4$ and A are as defined above. The intermediates which are also objects of this invention are represented by Formula II above.

According to the above procedure, a 1,3,4,5-tetrahydro-5 - phenyl - 2H-1-benzazepin-2-one is oxidized using 2,3-dichloro - 5,6 - dicyanoquinone as the oxidizing agent to give the 1,3 - dihydro - 5 - phenyl - 2H - 1-benzazepin-2-one intermediates (Formula II) of this invention. The 1,3 - dihydro - 5 - phenyl - 2H - 1-benzazepin-2- one intermediates are reacted with a di-lower alkylaminoalkyl halide, such as a chloride or bromide, to give the 1-(di-lower alkylaminoalkyl) - 1,3-dihydro-5-phenyl-2H-1-benzazepin-2-ones of this invention. Alternatively, the alkylation and oxidation steps may be carried out in reverse order to give the same products.

The 1,3,4,5-tetrahydro-5-phenyl-2H-1-benzazepin-2-one starting materials are prepared by treating a 3,4-dihydro-4-phenyl-1(2H)-naphthalenone of the following formula:

FORMULA III

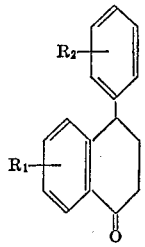

with hydrogen azide and a mineral acid, such as sulfuric acid, or with sodium azide, acetic acid and a mineral acid, such as sulfuric acid. By this procedure, the 1,3,4,5-tetrahydro-5-phenyl-2H-1-benzazepin-2-one is prepared with the corresponding 2,3,4,5-tetrahydro-5-phenyl-1H-2-benzazepin-1-one isomer. These isomers are separated by recrystallization or by chromatography. Preferably, the 1,3,4,5-tetrahydro-5-phenyl-2H-1-benzazepin-2-one starting materials are prepared by reacting a 3,4-dihydro-4-phenyl-1(2H)-naphthalenone with hydroxylamine to give the corresponding oxime and reacting the oxime with polyphosphoric acid.

The 3,4-dihydro-4-phenyl-1(2H)-naphthalenone compounds of Formula III are prepared by reacting a diphenylacetaldehyde of the formula:

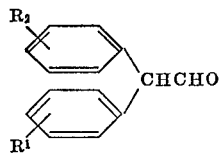

with malonic acid in the presence of an organic base such as pyridine to give a 4,4-diphenyl-3-butenoic acid of the formula:

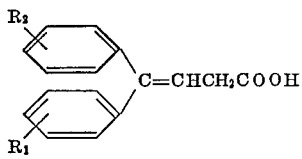

reducing the butenoic acid, for example by hydrogenating in the presence of a catalyst such as palladium on charcoal, and treating the resulting 4,4-diphenyl-3-butanoic acid with polyphosphoric acid or other Lewis acid known to cause ring closure.

Alternatively, 7-substituted 1,3,4,5-tetrahydro-5-phenyl-2H-1-benzazepin-2-one starting materials are prepared from 1,3,4,5-tetrahydro-5-phenyl-2H-1-benzazepin-2-ones by reacting with suitable reagents, for example the 7-halo derivative may be prepared by reacting with a halogenating agent such as a halogen or N-halosuccinimide; 7-alkyl derivatives by alkylating with alkyl halides using acid catalysts in the well known Friedel-Crafts reaction and 7-alkoxy compounds by nitrating with nitric acid and then converting the 7-nitro compounds by well known procedures to the 7-alkoxy compounds.

The pharmaceutically acceptable, acid addition salts of the compounds of Formula I are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric, and nitric acids. Of course, these salts may also be prepared by the classical method of double decomposition of appropriate salts which is well known to the art.

The terms "lower alkyl" and "lower alkoxy" where used herein denote groups having 1 to 4, preferably 1 to 2, carbon atoms and "halo" denotes chloro, bromo or fluoro.

Although Bertho, Chem. Ber. 90:29 (1957), reported the preparation of a compound to which he assigned the following structural formula:

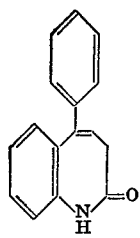

it has been reported (Loev et al., Arz. Forsch. 20:974, 1970, footnote**) that the compound obtained by the reaction procedure described by Bertho was not the benzazepinone of the above formula. Thus, as indicated hereabove, the intermediates of Formula II are also objects of this invention.

The following examples are not limiting but are illustrative of the compounds of this invention and procedures for their preparation.

EXAMPLE 1

To a solution of 24.4 g. of hydroxylamine hydrochloride in 150 ml. of water is added 100 ml. of 10% aqueous sodium hydroxide solution. 3,4-dihydro-4-phenyl-1(2H)-naphthalenone (39 g.) is dissolved in 50 ml. of hot ethanol and the solution is cooled and added to the hydroxylamine solution. The resulting mixture is heated on a steam bath and ethanol is added until a clear solution is obtained. The solution is then heated for 20 minutes, then cooled slowly. The solid is filtered off and dissolved in dichloromethane. The solution is dried over magnesium sulfate, then filtered and concentrated to dryness to give, as the residue, 3,4-dihydro - 4 - phenyl-1(2H)-naphthalenone oxime.

To 1650 g. of polyphosphoric acid at 120° C. is added portionwise with stirring 57 g. of 3,4-dihydro-4-phenyl-1(2H)-naphthalenone oxime. The resulting mixture is stirred and kept at 120–130° C. for 15 minutes, then cooled and poured onto a large volume of ice. The resulting mixture is stirred well and filtered. The solid material obtained is dissolved in dichloromethane. The organic layer is dried over magnesium sulfate, then concentrated in vacuo. The residue is recrystallized from ethyl acetate and washed with petroleum ether to give 1,3,4,5-tetrahydro-5-phenyl-2H-1-benzazepin-2-one.

To a solution of 30 g. of dichlorodicyanoquinone in 600 ml. of dry benzene is added 25 g. of 1,3,4,5-tetrahydro-5-phenyl-2H-1-benzazepin-2-one. The resulting solution is heated at reflux on a steam bath with stirring for 16 hours. The solid that separates is removed by filtration. The filtrate is concentrated to dryness in vacuo and the residue is stirred with cold ether. Filtering and recrystallizing from acetonitrile gives 1,3-dihydro-5-phenyl-2H-1-benzazepin-2-one.

To a mixture of 1.2 g. of a 57% dispersion of sodium hydride in mineral oil and 50 ml. of dry dimethylsulfoxide is added, dropwise with stirring, a solution of 6 g. of 1,3-dihydro-5-phenyl-2H-1-benzazepin-2-one in 100 ml. of dry dimethylsulfoxide. After the addition is complete, stirring is continued for 30 minutes, then a solution of 9.3 g. of 3-dimethylaminopropyl chloride in 150 ml. of dry benzene is added at a rapid dropwise rate. The resulting solution is heated on a steam bath for 16 hours. The mixture is cooled, diluted with 10 ml. of ethanol, then 10 ml. of water and then concentrated in vacuo. The residue is stirred with water and extracted with ether. The ether layer is extracted with dilute hydrochloric acid. The acid extract is made basic with 40% aqueous sodium hydroxide solution. The oil layer is extracted with ether and the ether extract is dried over magnesium sulfate, filtered and concentrated. The residue is stirred with petroleum ether and filtered to give 1-[3-(dimethylamino)propyl]-1,3-dihydro-5-phenyl-2H-1-benzazepin-2-one.

EXAMPLE 2

A solution of 9.3 g. of 1,3-dihydro-5-phenyl-2H-1-benzazepin-2-one in 50 ml. of dry dimethylsulfoxide is added dropwise with stirring to a mixture of 1.83 g. of a 57% dispersion of sodium hydride in mineral oil. The resulting mixture is stirred for 30 minutes, then 13 g. of 2-dimethylaminoethyl chloride in 100 ml. of dry benzene is added dropwise at a rapid rate. After working up as in Example 1 and recrystallizing the solid obtained from petroleum ether, using charcoal, 1-[2-(dimethylamino)

ethyl]-1,3-dihydro-5-phenyl-2H-1-benzazepin-2-one is obtained.

A sample of the above material is dissolved in ether and anhydrous hydrogen chloride is bubbled into the solution. Filtering and recrystallizing from isopropanol gives the hydrochloride salt of 1-[2-(dimethylamino)ethyl]-1,3-dihydro-5-phenyl-2H-1-benzazepin-2-one.

EXAMPLE 3

To a solution of 5 g. of 1,3,4,5-tetrahydro-5-phenyl-2H-1-benzazepin-2-one in 25 ml. of dimethylformamide is added 2.82 g. of N-chlorosuccinimide. The resulting solution is heated on a steam bath for one hour, then cooled and poured into water. The solid material is filtered off and then dissolved in dichloromethane. The solution is dried with molecular sieve and magnesium sulfate, then concentrated in vacuo. The residue is recrystallized from ethyl acetate, using charcoal, to give 7-chloro-1,3,4,5-tetrahydro-5-phenyl-2H-1-benzazepin-2-one.

To a solution of 3.44 g. of dichlorodicyanoquinone in dry benzene is added 33 g. of 7-chloro-1,3,4,5-tetrahydro-5-phenyl-2H-1-benzazepin-2-one. The resulting solution is heated at reflux with stirring for 16 hours, then cooled and filtered. Concentrating the filtrate to dryness in vacuo, recrystallizing the residue from ethyl acetate, and chromatographing on a silica gel column using ether as the developing solvent gives 7-chloro-1,3-dihydro-5-phenyl-2H-1-benzazepin-2-one.

By the procedure of Example 1, 7-chloro-1,3-dihydro-5-phenyl-2H-1-benzazepin-2-one in dry dimethylsulfoxide is added to a mixture of 57% dispersion of sodium hydride in mineral oil and dry dimethylsulfoxide. After stirring the resulting mixture for 30 minutes, a solution of 3-dimethylaminopropyl chloride in dry benzene is added. The resulting solution is heated on a steam bath for 16 hours and worked up by the procedure of Example 1 to give 7-chloro-1-[3-(dimethylamino)propyl]-1,3-dihydro-5-phenyl-2H-1-benzazepin-2-one.

EXAMPLE 4

Malonic acid (104 g.) and 4 ml. of pyridine are added to 264 g. of bis(p-chlorophenyl)acetaldehyde dissolved in 1 liter of dry toluene. The resulting mixture is stirred and heated slowly to reflux on a steam bath and refluxing is continued for about 2.5 hours. The solution is chilled and the solid is filtered off, washed with dilute hydrochloric acid and then with water to give 4,4-di(p-chlorophenyl)-3-butenoic acid.

4,4-di(p-chlorophenyl)-3-butenoic acid (306 g.) is added to a dilute aqueous sodium hydroxide solution. Palladium on charcoal is added and the mixture is hydrogenated under reduced pressure, then filtered and acidified with concentrated hydrochloric acid. Filtering gives 4,4-di(p-chlorophenyl)butanoic acid.

To 3 kg. of polyphosphoric acid at 140° C. is added 123.2 g. of 4,4-di(p-chlorophenyl)butanoic acid with stirring. The resulting mixture is then stirred manually, heated to 160° C. and kept at 160° C. for 10 minutes, then cooled slightly and poured onto a large volume of ice and stirred. The solid is filtered off and dissolved in ether. The ether solution is washed with 10% aqueous sodium hydroxide solution and then with water, dried, treated with charcoal, filtered and concentrated in vacuo to give 7-chloro-4-(p-chlorophenyl)-3,4-dihydro-1(2H)naphthalenone.

Using 7-chloro-4-(p-chlorophenyl)-3,4-dihydro-1-(2H)naphthalenone in place of 3,4-dihydro-4-phenyl-1-(2H)naphthalenone in the procedure of Example 1, the product is 8-chloro-5-(p-chlorophenyl)-1-[3-(dimethylamino)propyl]-1,3-dihydro-2H-1-benzazepin-2-one.

EXAMPLE 5

By the procedure of Example 4 using, in place of bis-(p-chlorophenyl)acetaldehyde, the following acetaldehyde compounds:

bis(p-bromophenyl)acetaldehyde
bis(p-fluorophenyl)acetaldehyde
o-chlorophenyl-p-chlorophenylacetaldehyde
bis(p-methoxyphenyl)acetaldehyde
di(p-tolyl)acetaldehyde
phenyl-p-tolylacetaldehyde
o-tolyl-p-tolylacetaldehyde the following products are obtained:

8-bromo-5-(p-bromophenyl)-1-[3-(dimethylamino)propyl]-1,3-dihydro-2H-1-benzazepin-2-one
1-[3-(dimethylamino)propyl]-8-fluoro-5-(p-fluorophenyl)-1,3-dihydro-2H-1-benzazepin-2-one
8-chloro-5-(o-chlorophenyl)-1-[3-(dimethylamino)propyl]-1,3-dihydro-2H-1-benzazepin-2-one and
6-chloro-5-(p-chlorophenyl)-1-[3-(dimethylamino)propyl]-1,3-dihydro-2H-1-benzazepin-2-one
1-[3-(dimethylamino)propyl]-1,3-dihydro-8-methoxy-5-(p-methoxyphenyl)-2H-1-benzazepin-2-one
1-[3-(dimethylamino)propyl]-1,3-dihydro-8-methyl-5-(p-tolyl)-2H-1-benzazepin-2-one
1-[3-(dimethylamino)propyl]-1,3-dihydro-8-methyl-5-phenyl-2H-1-benzazepin-2-one and 1-[3-(dimethylamino)propyl]-1,3-dihydro-5-(p-tolyl)-2H-1-benzazepin-2-one
1-[3-(dimethylamino)propyl]-1,3-dihydro-8-methyl-5-(o-tolyl(-2H-1-benzazepin-2-one and 1-[3-(dimethylamino)propyl]-1,3-dihydro-6-methyl-5-(p-tolyl)-2H-1-benzazepin-2-one.

EXAMPLE 6

Using in place of 2-dimethylaminoethyl chloride in the procedure of Example 2, the following:

3-diethylaminopropyl chloride
3-dimethylamino-1-methylpropyl bromide
4-dimethylaminobutyl chloride the products are:

1-[3-(dimethylamino)propyl]-1,3-dihydro-5-phenyl-2H-1-benzazepin-2-one
1-[3-(dimethylamino)-1-methylpropyl]-1,3-dihydro-5-phenyl-2H-1-benzazepin-2-one
1-[4-(dimethylamino)butyl]-1,3-dihydro-5-phenyl-2H-1-benzazepin-2-one.

EXAMPLE 7

A solution of 125 g. of p-trifluoromethylbenzophenone and 98 g. of methyl α-chloropropionate in 200 ml. of anhydrous ether is cooled to 10° C. and 45.5 g. of sodium methoxide is added. After 20 hours, a cold solution of 30 ml. of hydrochloric acid in 200 ml. of water is added and the organic layer is separated, dried and concentrated. To the residue 200 ml. of 25% aqueous sodium hydroxide solution is added and the resulting mixture is stirred at 50° C. for 18 hours, then acidified with 6 N hydrochloric acid and extracted with ether. The extract is concentrated and the residue is heated in vacuo to 180° C. when decarboxylation and distillation occurs to give phenyl-p-trifluoromethylphenylacetaldehyde.

The phenyl-p-trifluoromethylphenylacetaldehyde is converted to 1-[3-(dimethylamino)propyl]-1,3-dihydro-5-(p-trifluoromethylphenyl)-2H-1-benzazepin-2-one by the procedure of Example 4.

EXAMPLE 8

Using m-methoxybenzophenone in place of p-trifluoromethylbenzophenone in the procedure of Example 7, m-methoxyphenyl-phenylacetaldehyde is obtained. By the procedure of Example 4, using m-methoxyphenyl-phenylacetaldehyde in place of bis(p-chlorophenyl)acetaldehyde, the products are:

1-[3-(dimethylamino)propyl]-1,3-dihydro-7-methoxy-5-phenyl-2H-1-benzazepin-2-one,
1-[3-(dimethylamino)propyl]-1,3-dihydro-9-methoxy-5-phenyl-2H-1-benzazepin-2-one and 1-[3-(dimethylamino)propyl]-1,3-dihydro-5-(m-methoxyphenyl)-2H-1-benzazepin-2-one.

By the same procedure, using m-methylbenzophenone as the starting material, the products are:

1-[3-(dimethylamino)propyl]-1,3-dihydro-7-methyl-5-phenyl-2H-1-benzazepin-2-one,
1-[3-(dimethylamino)propyl]-1,3-dihydro-9-methyl-5-phenyl-2H-1-benzazepin-2-one and
1-[3-(dimethylamino)propyl]-1,3-dihydro-5-(m-tolyl)-2H-1-benzazepin-2-one.

EXAMPLE 9

A mixture of 1-[3-(dimethylamino)propyl]-1,3-dihydro-5-phenyl-2H-1-benzazepin-2-one, prepared as in Example 1, and an equimolar amount of fumaric acid in ethyl acetate is stirred at room temperature, then evaporated to dryness in vacuo. The residue is recrystallized from isopropanol to give the fumarate salt of 1-[3-(dimethylamino)propyl]-1,3-dihydro-5-phenyl-2H-1 - benzazepin-2-one.

What is claimed is:
1. A compound of the formula:

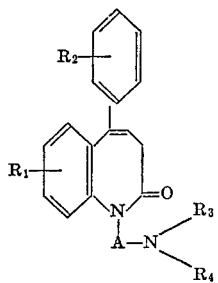

in which:

A is alkylene having 2 to 4 carbon atoms;
$R_1$ is hydrogen, halo, lower alkyl or lower alkoxy;
$R_2$ is hyrogen, halo, trifluoromethyl, lower alkyl or lower alkoxy and
$R_3$ and $R_4$ are lower alkyl or pharmaceutically acceptable, acid addition salts thereof.

2. A compound according ot claim 1 in which A is ethylene or propylene.
3. A compound according to claim 1 in which A is ethylene, $R_1$ and $R_2$ are hydrogen and $R_3$ and $R_4$ are methyl.
4. A compound according to claim 1 in which A is propylene, $R_1$ and $R_2$ are hydrogen and $R_3$ and $R_4$ are methyl.
5. A compound of the formula:

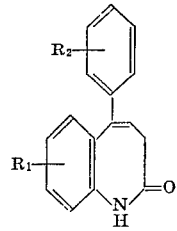

in which:

$R_1$ is hydrogen, halo, lower alkyl or lower alkoxy and
$R_2$ is hydrogen, halo, trifluoromethyl, lower alkyl or lower alkoxy.

6. A compound according ot claim 5 in which $R_1$ and $R_2$ are hydrogen.
7. A compound according to claim 5 in which $R_1$ is chloro in the 7-position and $R_2$ is hydrogen.

References Cited
UNITED STATES PATENTS

| | | | |
|---|---|---|---|
| 2,785,159 | 3/1957 | Hoffmann et al. | 260—239.3 B |
| 3,332,951 | 7/1967 | Rossi et al. | 260—286 |

OTHER REFERENCES

Subject Index: "Chemical Abstracts," vol. 67 (1967), abstracting.
Werner et al., "J. Med. Chem." vol. 10, No. 4, pp. 575–582 (1967).
Bertho: "Berichte," vol. 90 (1957), pp. 29–43.
Werner et al., "J. Med. Chem." vol. 10, pp. 575–582 (1970).
Loev et al., "Arz. Forsch.", vol. 20, pp. 974–975 (1970).

HENRY R. JILES, Primary Examiner

R. T. BOND, Assistant Examiner

U.S. Cl. X.R.

260—590, 599, 520, 515 R